United States Patent
Jain et al.

(10) Patent No.: US 10,708,858 B2
(45) Date of Patent: Jul. 7, 2020

(54) TECHNIQUES FOR IMPROVED POWER CONSUMPTION IN USER EQUIPMENTS

(71) Applicant: QUALCOMM Incorporated, San Diego, CA (US)

(72) Inventors: Sachin Jain, Santa Clara, CA (US); Jayan Krishnaswami, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/021,967

(22) Filed: Jun. 28, 2018

(65) Prior Publication Data

US 2020/0008143 A1    Jan. 2, 2020

(51) Int. Cl.
| | |
|---|---|
| *H04W 52/02* | (2009.01) |
| *H04W 4/60* | (2018.01) |
| *H04W 72/04* | (2009.01) |
| *H04W 24/10* | (2009.01) |
| *H04W 88/06* | (2009.01) |

(52) U.S. Cl.
CPC ......... *H04W 52/0209* (2013.01); *H04W 4/60* (2018.02); *H04W 24/10* (2013.01); *H04W 72/048* (2013.01); *H04W 72/0453* (2013.01); *H04W 88/06* (2013.01)

(58) Field of Classification Search
CPC combination set(s) only.
See application file for complete search history.

(56) References Cited

U.S. PATENT DOCUMENTS

| | | |
|---|---|---|
| 9,525,503 B2 | 12/2016 | Narathong et al. |
| 9,565,687 B2 | 2/2017 | Jarrahi et al. |
| 9,584,995 B2 | 2/2017 | Chuttani et al. |
| 2011/0217969 A1* | 9/2011 | Spartz .................. H04W 36/14 455/422.1 |
| 2013/0210484 A1* | 8/2013 | Jeenagala ............. H04W 88/06 455/552.1 |
| 2013/0244656 A1* | 9/2013 | Heo ...................... H04L 1/0033 455/436 |
| 2015/0257199 A1* | 9/2015 | Su ...................... H04W 52/0232 455/552.1 |
| 2015/0257200 A1* | 9/2015 | Su ...................... H04W 52/0232 455/552.1 |
| 2016/0007190 A1* | 1/2016 | Wane ...................... H04W 4/50 455/419 |

(Continued)

*Primary Examiner* — Yee F Lam
(74) *Attorney, Agent, or Firm* — Arent Fox, LLP

(57) ABSTRACT

The present disclosure provides for reducing power consumption in multi-subscriber identity module (SIM) devices. For example, a user equipment (UE) may determine that a first subscription associated with a first SIM corresponds to a designated data subscription (DDS). The first subscription being different from a second subscription associated with a second SIM at the UE. In one aspect, the UE may transmit carrier aggregation (CA) capability information including one or more intra-cell frequency bands for the second subscription based on determining that the first subscription corresponds to the DDS. In another aspect, the UE may adjust a measurement report identifying the at least one neighboring intra-band network entity based on determining that the at least one neighboring intra-band network entity is available.

26 Claims, 5 Drawing Sheets

(56) References Cited

U.S. PATENT DOCUMENTS

| | | | |
|---|---|---|---|
| 2016/0127998 A1* | 5/2016 | Roessel | H04W 52/0277 370/311 |
| 2016/0142998 A1* | 5/2016 | Tsai | H04B 1/3816 455/458 |
| 2016/0227547 A1* | 8/2016 | Su | H04W 52/0232 |
| 2016/0234825 A1* | 8/2016 | Axmon | H04W 8/00 |
| 2016/0323933 A1* | 11/2016 | Song | H04W 88/06 |
| 2017/0013630 A1 | 1/2017 | Franz et al. | |
| 2017/0171902 A1* | 6/2017 | Tillman | H04W 28/18 |
| 2017/0273053 A1 | 9/2017 | Ryu et al. | |
| 2017/0280507 A1* | 9/2017 | Wang | H04W 24/02 |
| 2018/0049213 A1* | 2/2018 | Gholmieh | H03D 7/16 |
| 2018/0146365 A1* | 5/2018 | Dhanapal | H04W 8/24 |
| 2018/0160422 A1* | 6/2018 | Pathak | H04W 76/27 |
| 2018/0184309 A1* | 6/2018 | Bhardwaj | H04W 24/08 |
| 2018/0359284 A1* | 12/2018 | Kotreka | H04W 76/15 |
| 2019/0014542 A1* | 1/2019 | Jain | H04W 52/0258 |

\* cited by examiner

TECHNIQUES FOR IMPROVED POWER CONSUMPTION IN USER EQUIPMENTS

BACKGROUND

Aspects of the present disclosure relate generally to wireless communication networks, and more particularly, to techniques to optimize power consumption in voice over Long Term Evolution (VoLTE) and/or multi-subscriber identity module (SIM) devices.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for various communication technologies, improving power consumption for VoLTE or multi-SIM devices may provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of communication at a user equipment (UE). The method may include determining that a first subscription associated with a first subscriber identity module (SIM) corresponds to a designated data subscription (DDS), the first subscription being different from a second subscription associated with a second SIM at the UE. The method may further include transmitting, to at least one network entity, carrier aggregation (CA) capability information including one or more intra-cell frequency bands for the second subscription based on determining that the first subscription associated with the first SIM corresponds to the DDS.

In another aspect, the present disclosure includes a UE for wireless communication including a memory and at least one processor in communication with the memory. The at least one processor may be configured to determine that a first subscription associated with a first SIM corresponds to a DDS, the first subscription being different from a second subscription associated with a second SIM at the UE. The at least one processor may further be configured to transmitting, to at least one network entity, CA capability information including one or more intra-cell frequency bands for the second subscription based on determining that the first subscription associated with the first SIM corresponds to the DDS.

In an additional aspect, the present disclosure includes a UE for communication. The UE may include means for determining that a first subscription associated with a first SIM corresponds to a DDS, the first subscription being different from a second subscription associated with a second SIM at the UE. The UE may further include means for transmitting, to at least one network entity, CA capability information including one or more intra-cell frequency bands for the second subscription based on determining that the first subscription associated with the first SIM corresponds to the DDS.

In yet another aspect, the present disclosure includes a computer-readable medium for communication at a UE. The computer-readable medium may include code for determining that a first subscription being associated with a first SIM corresponds to a DDS, the first subscription different from a second subscription associated with a second SIM at the UE. The computer-readable medium may further include code for transmitting, to at least one network entity, CA capability information including one or more intra-cell frequency bands for the second subscription based on determining that the first subscription associated with the first SIM corresponds to the DDS.

In an aspect, the present disclosure includes a method of communication at a user equipment (UE). The method may include determining that a first subscription associated with a first SIM corresponds to a DDS, with the first subscription being different from a second subscription associated with a second SIM at the UE and the second subscription being associated with a network entity. The method may further include obtaining at least one measurement of one or more neighboring network entities for the second subscription. The method may further include determining whether at least one neighboring intra-band network entity is available for CA on the second subscription based on the at least one measurement, with the at least one neighboring intra-band network entity and the network entity associated with a similar frequency band. The method may further include adjusting a measurement report identifying the at least one neighboring intra-band network entity based on determining that the at least one neighboring intra-band network entity is available. The method may further include transmitting, to the network entity, the measurement report identifying the at least one neighboring intra-band network entity.

In another aspect, the present disclosure includes a UE for wireless communication including a memory and at least one processor in communication with the memory. The at least one processor may be configured to determine that a first subscription associated with a first SIM corresponds to a DDS, with the first subscription being different from a second subscription associated with a second SIM at the UE and the second subscription being associated with a network entity. The at least one processor may further be configured to obtain at least one measurement of one or more neighboring network entities for the second subscription. The at least one processor may further be configured to determine whether at least one neighboring intra-band network entity is available for CA on the second subscription based on the at least one measurement, with the at least one neighboring intra-band network entity and the network entity associated with a similar frequency band. The at least one processor may further be configured to adjust a measurement report identifying the at least one neighboring intra-band network entity based on determining that the at least one neighboring intra-band network entity is available. The at least one processor may further be configured to transmit, to the network entity, the measurement report identifying the at least one neighboring intra-band network entity.

In an additional aspect, the present disclosure includes a UE for communication. The UE may include means for determining that a first subscription associated with a first SIM corresponds to a DDS, with the first subscription being different from a second subscription associated with a second SIM at the UE and the second subscription being associated with a network entity. The UE may further include means for obtaining at least one measurement of one or more neighboring network entities for the second subscription. The UE may further include means for determining whether at least one neighboring intra-band network entity is available for CA on the second subscription based on the at least one measurement, with the at least one neighboring intra-band network entity and the network entity associated with a similar frequency band. The UE may further include means for adjusting a measurement report identifying the at least one neighboring intra-band network entity based on determining that the at least one neighboring intra-band network entity is available. The UE may further include means for transmitting, to the network entity, the measurement report identifying the at least one neighboring intra-band network entity.

In yet another aspect, the present disclosure includes a computer-readable medium for communication at a UE. The computer-readable medium may include code for determining that a first subscription associated with a first SIM corresponds to a DDS, with the first subscription being different from a second subscription associated with a second SIM at the UE and the second subscription being associated with a network entity. The computer-readable medium may further include code for obtaining at least one measurement of one or more neighboring network entities for the second subscription. The computer-readable medium may further include code for determining whether at least one neighboring intra-band network entity is available for CA on the second subscription based on the at least one measurement, with the at least one neighboring intra-band network entity and the network entity associated with a similar frequency band. The computer-readable medium may further include code for adjusting a measurement report identifying the at least one neighboring intra-band network entity based on determining that the at least one neighboring intra-band network entity is available. The computer-readable medium may further include code for transmitting, to the network entity, the measurement report identifying the at least one neighboring intra-band network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
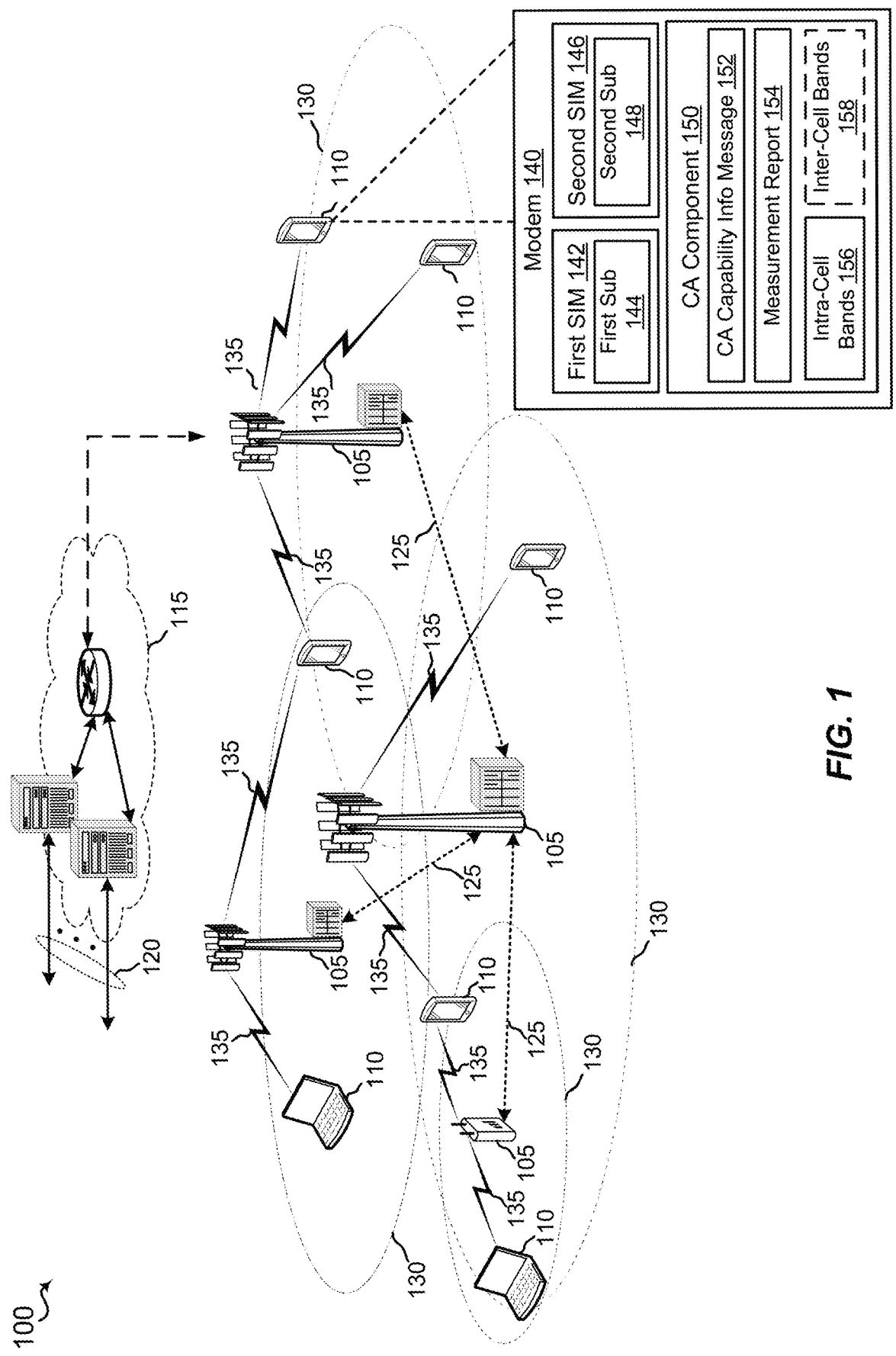
FIG. 1 is a schematic diagram of an example of a wireless communication network including at least one user equipment (UE) having a CA component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to reducing power consumption in a dual-subscriber identity module (SIM), dual-standby (DSDS) user equipment (UE) (also referred to as a multi-SIM device). For example, some UEs may be configured to facilitate communication on two separate networks via two separate subscriptions. For example, DSDS devices may include two SIM cards, where one card may be for a first subscription and a second card may be for a second subscription. In DSDS devices, a user may set one or both subscriptions as a designated data subscription (DDS), where the chosen subscription will serve as the provider of data services to the UE.

Further, for some DSDS UEs, both subscriptions may operate on or using a single radio access technology (RAT) such as Long Term Evolution (LTE) and may be running independently. In such a scenario, a first subscriber may be a primary subscriber and set as a DDS, while a second subscriber may be a secondary subscriber. A UE may perform data transfer (e.g., application data and voice over LTE (VoLTE)) through the primary subscriber while the second subscriber may be used for VoLTE traffic. Some UEs may support a large number of LTE bands (e.g., 25+ bands). With support for such a large number of LTE bands, carrier aggregation (CA) combinations may also increase with multiple downlink/uplink CA combinations. However, communicating using CA may cause additional components to be activated by the UE which may increase power consumption. For example, performing CA on both subscriptions of a UE while one subscriber utilizes CA data rates may negatively impact power consumption.

As DSDS UEs operate according to a same RAT (e.g., LTE) on both subscriptions, the UEs may broadcast CA capabilities on both subscribers. However, in some aspects, the primary subscriber (e.g., DDS subscriber) may utilize a higher data rate (e.g., using CA) as this subscriber may be used for data communication for some or all of the applications (browsing, streaming, etc.), while the secondary subscriber may be used for VoLTE. Further, networks may typically configure secondary cells (Scells) to UEs having CA capabilities irrespective of throughput needs/considerations. Nonetheless, activation may depend on or be based on the data activity and/or network loading. Inter-band CA configuration may trigger a UE to activate multiple front end components (multiple ASMs, LNAs, etc.) to serve different bands/frequencies. Once the Scell is configured, a UE may configure multiple components (e.g., transceiver, eLNA, ASM) with CA combination parameters. Such configuration may increase power consumption as additional components are activated. The UE may also perform periodic measurements on configured Scells irrespective of primary cell (Pcell) channel conditions. The secondary subscription (e.g., VoLTE) may infrequently benefit from CA, yet due to configuration of the UE by the network, both subscriptions may be using CA for communication and thus increasing power consumption. The increase in power consumption may result from one or both of a configuration of Scells by the network which causes activation of additional UE resources/components or periodic Scell measurements by the UE.

As such, the present aspects provide techniques for reducing power consumption at a UE by selectively transmitting limited capabilities for the secondary subscription to the network. For example, in one aspect, a UE may broadcast intra-band CA capabilities on the VoLTE/secondary subscription to the network while omitting transmission of inter-band CA capabilities (e.g., forgoing broadcasting inter-band CA capabilities). In another aspect, the UE may control neighbor measurements reported to network.

Specifically, in an aspect, the present aspects provide a UE that may reduce power consumption related to CA on at least a second subscription by selectively transmitting certain frequency bands. For instance, the UE may determine that a first subscription associated with a first SIM corresponds to a DDS, with the first subscription being different from a second subscription associated with a second SIM at the UE. The UE may further transmit, to at least one network entity, CA capability information including one or more intra-cell frequency bands for the second subscription based on determining that the first subscription associated with the first SIM corresponds to the DDS.

In another aspect, the present aspects provide a UE that may reduce power consumption related to CA on at least a second subscription by adjusting a measurement report including neighboring cells operating at certain frequency bands. For example, the UE may determine that a first subscription associated with a first SIM that corresponds to a DDS, with the first subscription being different from a second subscription associated with a second SIM at the UE and the second subscription being associated with a network entity. The UE may further obtain at least one measurement of one or more neighboring network entities for the second subscription. The UE may further determine whether at least one neighboring intra-band network entity is available for CA on the second subscription based on the at least one measurement, with the at least one neighboring intra-band network entity and the network entity being associated with a similar frequency band. The UE may further adjust a measurement report identifying the at least one neighboring intra-band network entity based on determining that the at least one neighboring intra-band network entity is available. The UE may further transmit, to the network entity, the measurement report identifying the at least one neighboring intra-band network entity.

Additional features of the present aspects are described in more detail below with respect to FIGS. 1-4.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 4:
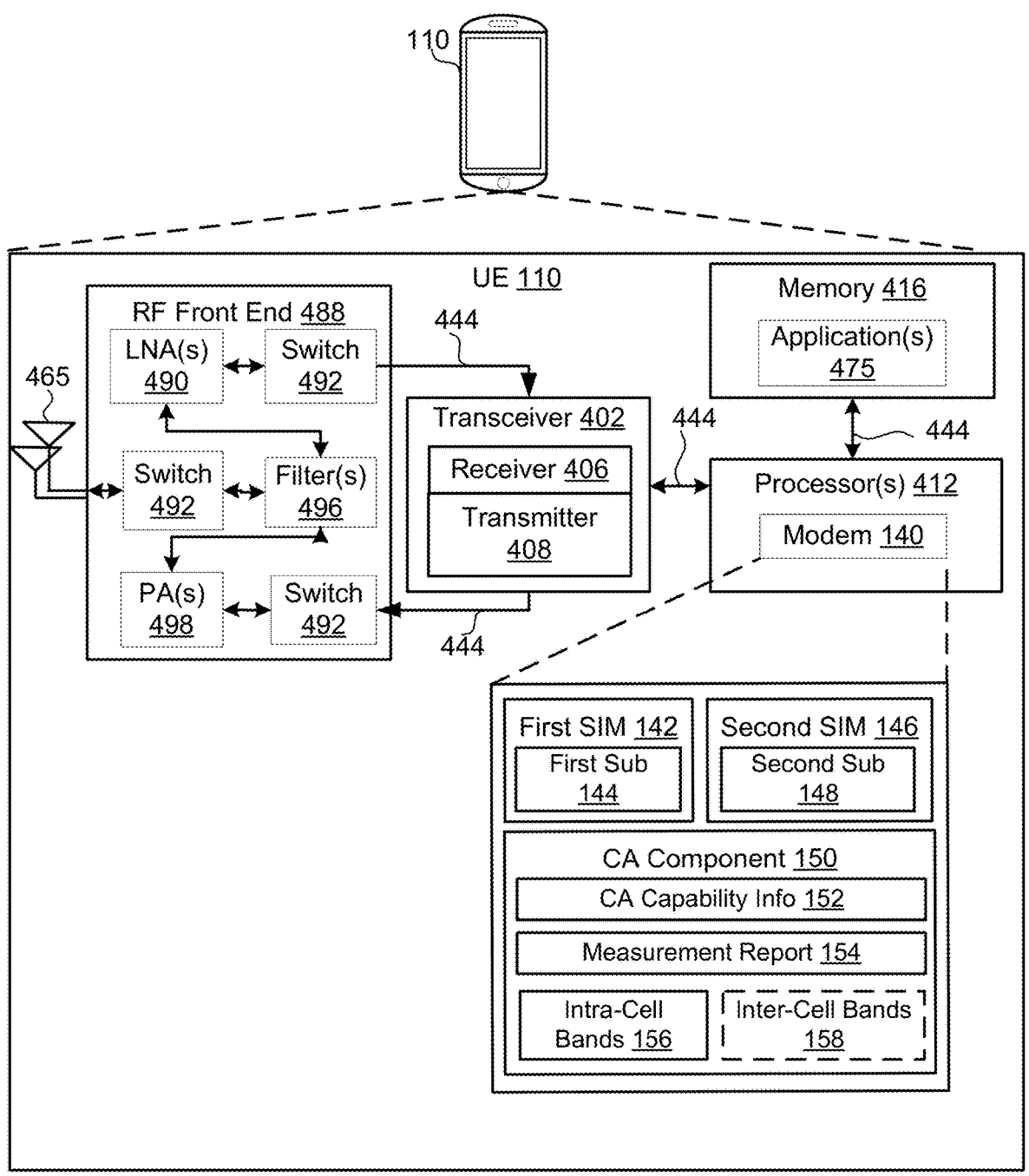
FIG. 4 is a schematic diagram of example components of the UE of FIG. 1.

Referring to FIG. 1, in accordance with various aspects of the present disclosure, an example wireless communication network 100 may include at least one base station 105 in communication with a UE 110. In some aspects, as used herein, the base station 105 may also be referred to as a network entity. The UE 110 may have a modem 140 including a CA component 150, a first SIM 142 having or associated with a first subscription 144, and a second SIM 146 associated with a second subscription 148. In particular, the CA component 150 may optimize power consumption at the UE 110 by selectively transmitting certain frequency bands such as intra-cell frequency bands 156 for a subscription that may not benefit from CA (e.g., a VoLTE subscriber). The CA component 150 may reduce power consumption at the UE 110, thereby enhancing standby and talk time by preferring a single component set configuration. For example, as shown in FIG. 4, the UE 110 may include a plurality of front end components for communication with one or more base stations 105. In some aspects, a first set of front end components may be used for communication on a first subscription 144 and a second set of front end components may be used for communication on a second subscription 144. The single component set configuration may provide for use of the same or similar front end components by at least one of the first subscription 144 or the second subscription 148 before and after CA configuration. That is, the UE 110 saves power by using the same front end components for communication after CA configuration. Hence, when the UE 110 receives the secondary cell information from the base station 105 for the non-DDS subscription (e.g., second subscription), the UE 110 may forgo activation of any additional front end components as the communication is within the intra-band frequency band 156. The single component set configuration may also be referred to as the single receiver (SRx) configuration.

In one aspect, the CA component 150 may be configured to determine a DDS setting and broadcast intra-band frequency bands 156 within a CA capability information message 152 on the non-DDS subscription (e.g., second subscription 148 corresponding to VoLTE subscription) (e.g., while excluding inter-band frequency bands). If the network 115 determines to add a Scell, the network 115 may configure intra-band Scells on the non-DDS or second subscription 148 based on the UE broadcasted capabilities. Thus, the UE 110 may enter the SRx configuration, thereby maintaining the same front end configuration as before the CA configuration. The forgoing may apply to non-LTE and VoLTE subscriptions as networks may configure UEs with 2G/3G speed once the UEs pass certain thresholds, yet the DDS subscription may remain the same, i.e. DDS subscription may be on 2G/3G network.

In another aspect, which may apply to both single SIM and multi-SIM UEs, the UE 110 may control neighbor measurements reported to the network 115. For instance, the network 115 may configure neighbor cells and based on UE measurements, add stronger cells as Scells for the UE 110. If the UE 110 is configured with Scells by the network 115 such that the SRx configuration may be maintained, the UE 110 may save power compared to cells which operate on different bands (non-SRx configuration). Specifically, to maintain the SRx configuration during CA, the UE 110 may control the neighbor measurements reported to the network 115 via a measurement report 154. In some aspects, the UE 110 may add an additional offset to prioritize preferred cells. For instance, the UE 110 may adjust or reduce a received signal strength indicator (RSSI) of less preferred cells (e.g., inter-cell frequency bands 158) by an offset so as to make the preferred cell (e.g., intra-cell frequency bands 156) stronger. In another example, the UE 110 may increase the RSSI of the preferred cells by an offset. In some aspects, the UE 110 may report cells (e.g., intra-cell frequency bands 156) which maintain SRx configuration. Further, the UE 110 may perform intra-band measurements on neighboring cells if the UE 110 locates at least one suitable cell on the same frequency band (e.g., to save power further by avoiding inter-band measurement) while not performing inter-band measurements.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (Scell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF)

band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
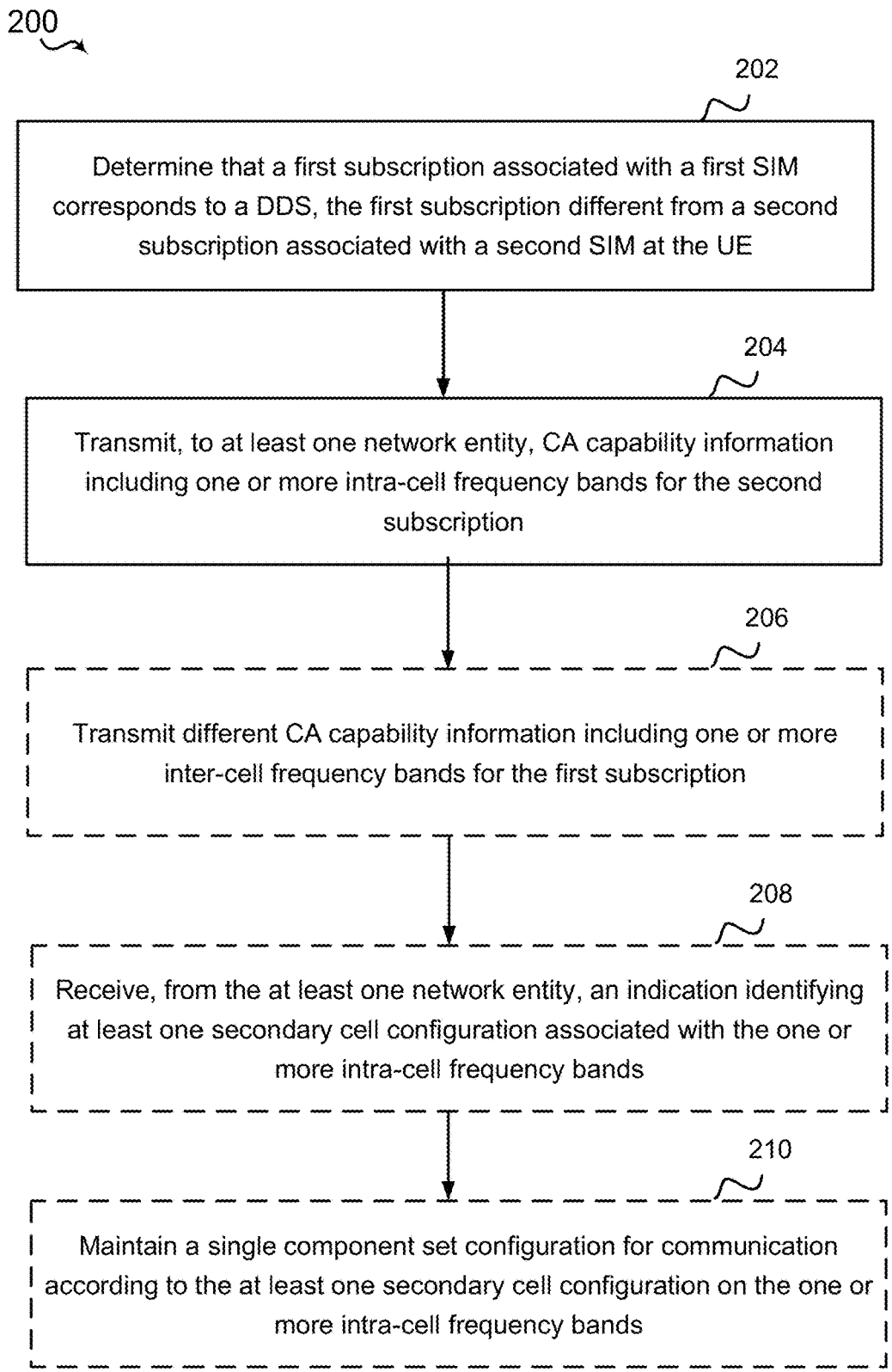
FIG. 2 is a flow diagram of an example of a method of wireless communication at a UE.

Referring to FIG. 2, for example, a method 200 of wireless communication at a UE such as UE 110 according to the aspects described herein may reduce power consumption by selectively transmitting intra-cell frequency bands for a non-DDS subscription and excluding inter-cell frequency bands even when such inter-cell frequency bands are available according to one or more of the herein-defined actions.

At block 202, the method 200 may determine that a first subscription associated with a first SIM corresponds to a DDS, with the first subscription being different from a second subscription associated with a second SIM at the UE. For example, the CA component 150 and/or one or more additional components as described herein with respect to FIG. 4 may determine that a first subscription 144 associated with a first SIM 142 corresponds to a DDS, with the first subscription 144 being different from a second subscription 148 associated with a second SIM 146 at the UE 110.

At block 204, the method 200 may transmit, to at least one network entity, CA capability information including one or more intra-cell frequency bands for the second subscription. For example, the CA component 150 and/or one or more additional components such as the transceiver 402 as described herein with respect to FIG. 4 may transmit, to at least one network entity (e.g., base station 105), CA capability information (e.g., within the CA capability information message 152) including one or more intra-cell frequency bands 156 for the second subscription 148 (e.g., non-DDS) based on determining that the first subscription 144 associated with the first SIM 142 corresponds to the DDS.

In some aspects, transmitting the CA capability information may include identifying at least one inter-cell frequency band 158 within the CA capability information, and removing the at least one inter-cell frequency band 158 from the CA capability information prior to transmission of the CA capability information message 152. In some aspects, transmitting the CA capability information may include forgoing inclusion of the inter-cell frequency band 158 within the CA capability information. In some aspects, the CA capability information may include the one or more intra-cell frequency bands 156 for the second subscription 148.

At block 206, the method 200 may optionally transmit different CA capability information including one or more inter-cell frequency bands for the first subscription. For example, the CA component 150 and/or one or more additional components such as the transceiver 402 as described herein with respect to FIG. 4 may transmit different CA capability information (e.g., within the CA capability information message 152) including one or more inter-cell frequency bands 158 for the first subscription 144 based on determining that the first subscription 144 associated with the first SIM 142 corresponds to the DDS.

At block 208, the method 200 may optionally receive, from the at least one network entity, an indication identifying at least one secondary cell configuration associated with the one or more intra-cell frequency bands. For example, the CA component 150 and/or one or more additional components such as the transceiver 402 as described herein with respect to FIG. 4 may receive, from the at least one network entity (e.g., base station 105), an indication identifying at least one secondary cell configuration associated with the one or more intra-cell frequency bands 156.

At block 210, the method 200 may maintain a single component set configuration for communication according to the at least one secondary cell configuration on the one or more intra-cell frequency bands. For example, the CA component 150 and/or one or more additional components as described herein with respect to FIG. 4 may maintain a single component set configuration for communication according to the at least one secondary cell configuration on the one or more intra-cell frequency bands 156. In some aspects, the single component set configuration may permit one or both the first subscription 144 and the second subscription 148 to maintain use of similar UE communication components (e.g., front end components) for CA (e.g., without the use of additional UE communication components).

In some aspects, the first subscription 144 may support a first technology type communication service and the second subscription 148 supports a second technology type service. In some aspects, the first technology type communication service may include at least one of application data or VoLTE communication, and the second technology type communication service includes VoLTE.

Figure 3A:
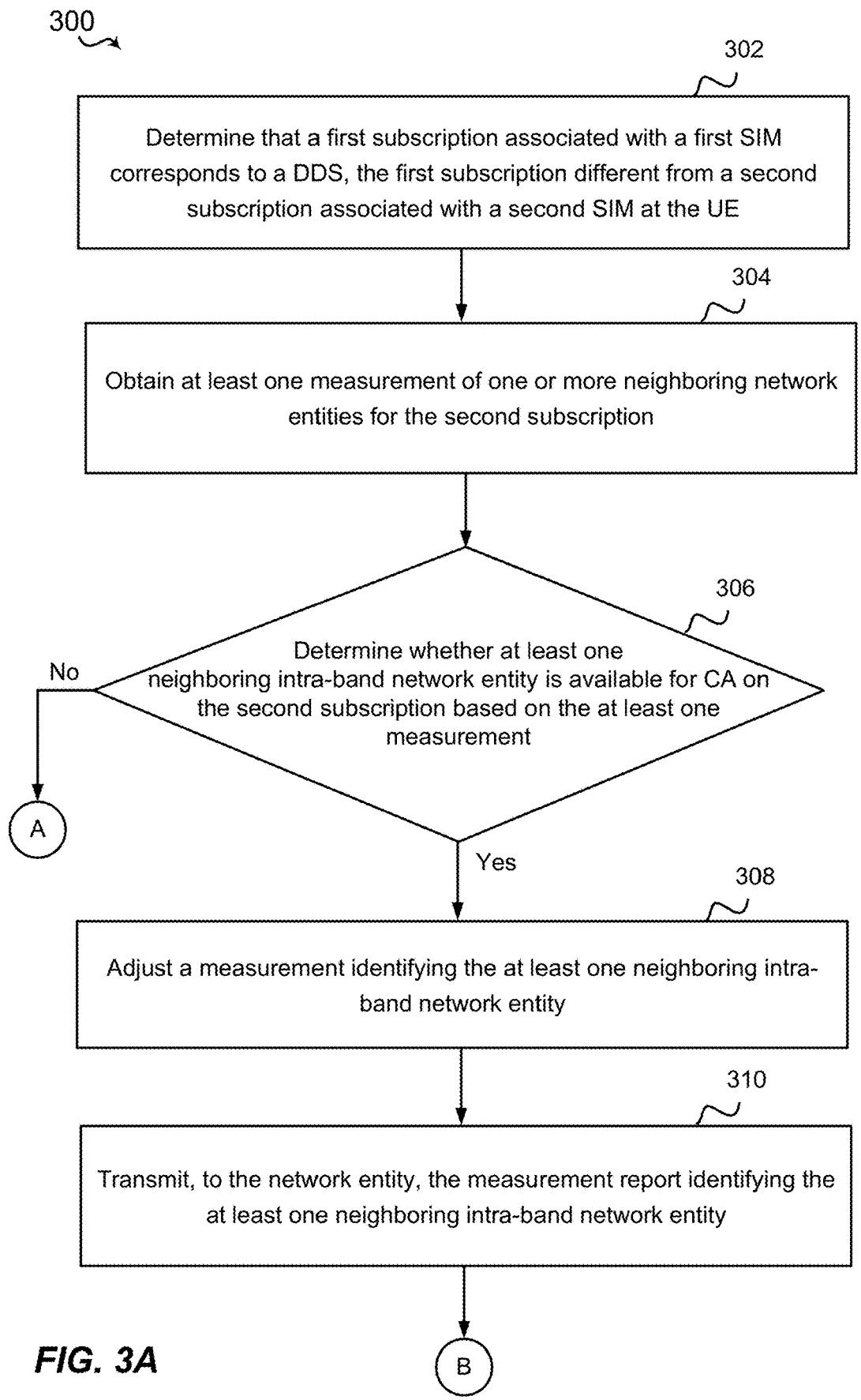
FIGS. 3A and 3B are flow diagrams of another example of a method of wireless communication at a UE.
Figure 3B:
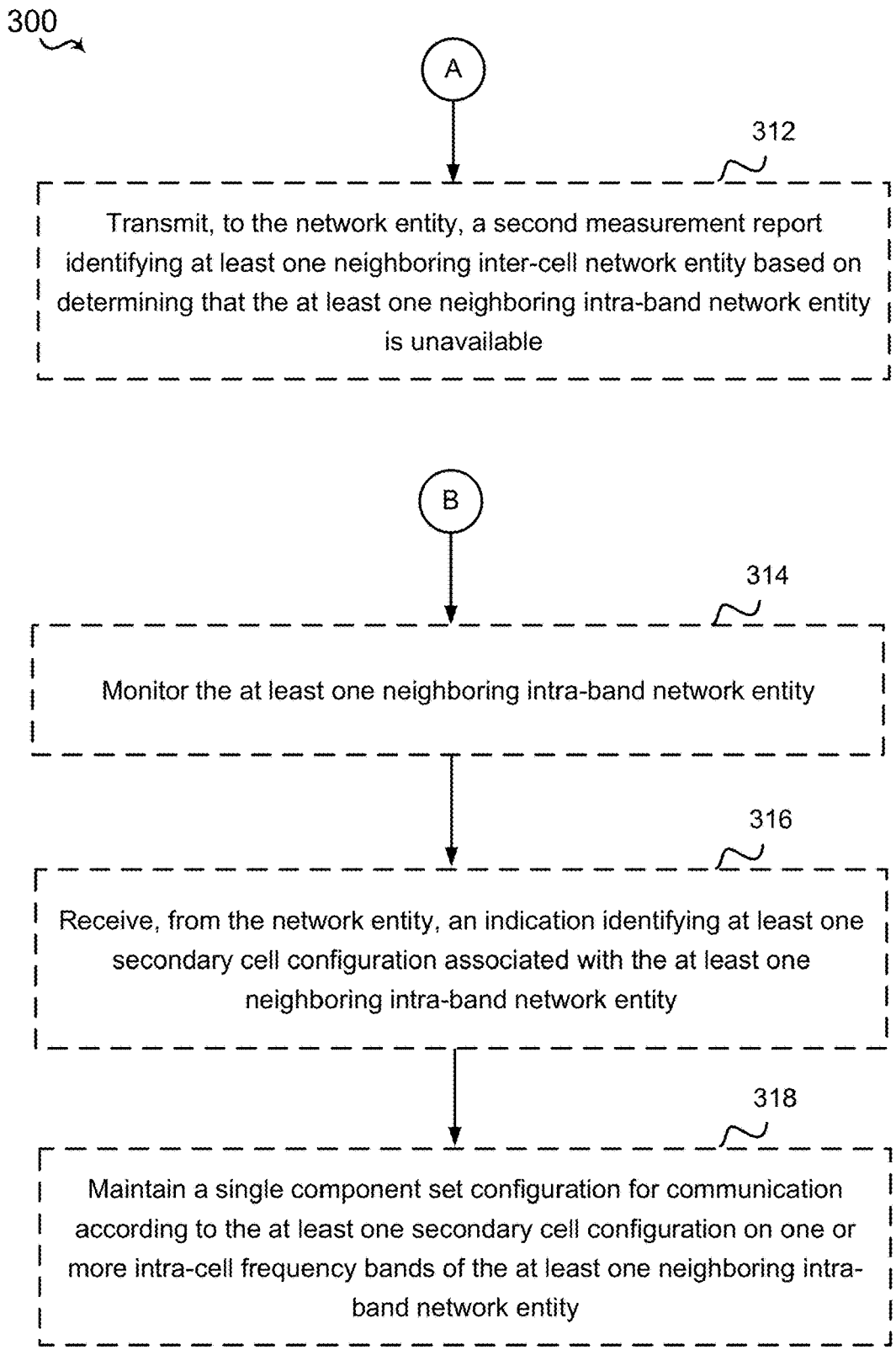

Referring to FIGS. 3A and 3B, for example, a method 300 of wireless communication at a UE such as UE 110 according to the aspects described herein may reduce power consumption at the UE 110 during CA by adjusting one or more measurements that are reported to the network, according to one or more of the herein-defined actions.

At block 302, the method 300 may determine that a first subscription associated with a first SIM corresponds to a DDS, with the first subscription being different from a second subscription associated with a second SIM at the UE and the second subscription being associated with a network entity. For example, the CA component 150 and/or one or more additional components as described herein with respect to FIG. 4 may determine that a first subscription 144 associated with a first SIM 142 corresponds to a DDS, the first subscription 144 different from a second subscription 148 associated with a second SIM 146 at the UE 110, the second subscription 148 associated with a network entity (e.g., base station 105).

At block 304, the method 300 may obtain at least one measurement of one or more neighboring network entities for the second subscription. For example, the CA component 150 and/or one or more additional components as described herein with respect to FIG. 4 may obtain at least one measurement (e.g., RSSI) of one or more neighboring network entities for the second subscription 148.

At block 306, the method 300 may determine whether at least one neighboring intra-band network entity is available for CA on the second subscription based on the at least one measurement, with the at least one neighboring intra-band network entity and the network entity being associated with a similar frequency band. For example, the CA component 150 and/or one or more additional components as described herein with respect to FIG. 4 may determine whether at least one neighboring intra-band network entity communicating according to an intra-cell frequency band 156 is available for CA on or for the second subscription 148 based at least on the at least one measurement, with the at least one neighboring intra-band network entity and the network entity being associated with a similar frequency band (e.g., operate on same frequency band).

At block 308, the method 300 may adjust a measurement report identifying the at least one neighboring intra-band network entity based on determining that the at least one neighboring intra-band network entity is available. For example, the CA component 150 and/or one or more additional components as described herein with respect to FIG. 4 may adjust a measurement report 154 identifying the at least one neighboring intra-band network entity based on determining that the at least one neighboring intra-band network entity is available.

In some aspects, adjusting the measurement report 154 identifying the at least one neighboring intra-band network entity may include omitting inclusion of any neighboring inter-cell band network entities in the measurement report based on the at least one measurement. In some aspects, the at least one measurement of the one or more neighboring network entities may include a measurement of the at least one neighboring intra-band network entity and a measurement of at least one neighboring inter-cell band network entity. In some aspects, adjusting the measurement report 154 may include adjusting the measurement of the at least one neighboring inter-cell band network entity to prioritize the at least one neighboring intra-band network entity.

At block 310, the method 300 may transmit, to the network entity, the measurement report identifying the at least one neighboring intra-band network entity. For example, the CA component 150 and/or one or more additional components such as the transceiver 402 as described herein with respect to FIG. 4 may transmit, to the network entity (e.g., base station 105), the measurement report 154 identifying the at least one neighboring intra-band network entity (e.g., as part of transmitting the measurements associated with the at least one neighboring intra-band network entity).

At block 312, the method 300 may transmit, to the network entity, a second measurement report identifying at least one neighboring inter-cell network entity based on determining that the at least one neighboring intra-band network entity is unavailable. For example, the CA component 150 and/or one or more additional components as described herein with respect to FIG. 4 may transmit, to the network entity, a second measurement report identifying at least one neighboring inter-cell network entity based on determining that the at least one neighboring intra-band network entity is unavailable. In some aspects, the measurement report 154 and the second measurement report may be the same or different.

At block 314, the method 300 may monitor the at least one neighboring intra-band network entity. For example, the CA component 150 and/or one or more additional components as described herein with respect to FIG. 4 may monitor the at least one neighboring intra-band network entity (e.g., while ignoring one or more neighboring inter-band network entities).

At bock 316, the method 300 may receive, from the network entity, an indication identifying at least one secondary cell configuration associated with the at least one neighboring intra-band network entity in response to transmitting the measurement report. For example, the CA component 150 and/or one or more additional components as described herein with respect to FIG. 4 may receive, from the network entity (e.g., base station 105), an indication identifying at least one secondary cell configuration associated with the at least one neighboring intra-band network entity in response to transmitting the measurement report 154.

At block 318, the method 300 may maintain a single component set configuration for communication according to the at least one secondary cell configuration on one or more intra-cell frequency bands of the at least one neighboring intra-band network entity. For example, the CA component 150 and/or one or more additional components as described herein with respect to FIG. 4 may maintain a single component set configuration for communication according to the at least one secondary cell configuration on one or more intra-cell frequency bands 156 of the at least one neighboring intra-band network entity.

In some aspects, the single component set configuration may permit one or both the first subscription 144 and the second subscription 148 to maintain use of similar UE communication components (e.g., RF front end components 488) for CA (e.g., without the use of additional UE communication components).

Referring to FIG. 4, one example of an implementation of UE 110 may include a variety of components, some of which have already been described above, but including components such as one or more processors 412 and memory 416 and transceiver 402 in communication via one or more buses 444, which may operate in conjunction with a modem 140 and CA component 150 as described herein. Further, the one or more processors 412, modem 140, memory 416, transceiver 402, radio frequency (RF) front end 488 and one or more antennas 465, may be configured to support voice and/or data calls (simultaneously or non-simultaneously) in one or more radio access technologies. In some aspects, the modem 140 may be the same as or similar to the modem 140.

In an aspect, the one or more processors 412 can include a modem 140 that uses one or more modem processors. The various functions related to CA component 150 may be included in modem 140 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 140 associated with CA component 150 may be performed by transceiver 402.

Also, memory 416 may be configured to store data used herein and/or local versions of applications 475 or CA component 150 and/or one or more of the subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining CA component 150 and/or one or more of its subcomponents, and/or data associated therewith, when UE 110 is operating at least one processor 412 to execute CA component 150 and/or one or more of the subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a RF receiver. In an aspect, receiver 406 may receive signals transmitted by at least one base station 105. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may include, but is not limited to, an RF transmitter.

Moreover, in an aspect, UE 110 may include RF front end 488, which may operate in communication with one or more antennas 465 and transceiver 402 for receiving and transmitting radio transmissions, for example, wireless communications transmitted by at least one base station 105 or wireless transmissions transmitted by UE 110. The RF front end 488 may be communicatively couples with one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and the specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and a corresponding specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 402 to operate at a specified frequency and power level based on the UE configuration of the UE 110 and the communication protocol used by the modem 140.

In an aspect, the modem 140 can be a multiband-multimode modem, which can process digital data and communicate with transceiver 402 such that the digital data is sent and received using transceiver 402. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of UE 110 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of communication at a user equipment (UE), comprising:
   determining that a first subscription associated with a first subscriber identity module (SIM) corresponds to a designated data subscription (DDS), with the first subscription being different from a second subscription associated with a second SIM at the UE;
   identifying at least one inter-cell frequency band and intra-cell frequency band within carrier aggregation (CA) capability information;
   removing the at least one identified inter-cell frequency band from the CA capability information prior to transmission of the CA capability information; and
   transmitting, to at least one network entity, CA capability information including the at least one intra-cell frequency band for the second subscription based in part on determining that the first subscription associated with the first SIM corresponds to the DDS.

2. The method of claim 1, wherein at least one inter-cell frequency band is excluded from the CA capability information.

3. The method of claim 1, further comprising:
   in response to transmitting the CA capability information:
   receiving, from the at least one network entity, an indication identifying at least one secondary cell configuration associated with the one or more intra-cell frequency bands; and
   maintaining a single component set configuration for communication according to the at least one secondary cell configuration on the one or more intra-cell frequency bands.

4. The method of claim 3, wherein the single component set configuration permits both the first subscription and the second subscription to use similar UE communication components for CA.

5. The method of claim 1, further comprising transmitting different CA capability information including one or more inter-cell frequency bands for the first subscription based on determining that the first subscription associated with the first SIM corresponds to the DDS.

6. The method of claim 1, wherein the first subscription supports a first technology type communication service and the second subscription supports a second technology type communication service.

7. The method of claim 6, wherein the first technology type communication service includes at least one of application data or voice over Long Term Evolution (VoLTE) communication, and the second technology type communication service includes VoLTE communication.

8. A user equipment (UE) for wireless communication, comprising:
   a memory; and
   at least one processor in communication with the memory, wherein the at least one processor is configured to:
   determine that a first subscription associated with a first subscriber identity module (SIM) corresponds to a designated data subscription (DDS), with the first subscription being different from a second subscription associated with a second SIM at the UE;
   identify at least one inter-cell frequency band and intra-cell frequency band within carrier aggregation (CA) capability information;
   remove the at least one inter-cell frequency band from the CA capability information prior to transmission of the CA capability information; and
   transmit, to at least one network entity, CA capability information including the at least one intra-cell frequency band for the second subscription based on determining that the first subscription associated with the first SIM corresponds to the DDS.

9. The UE of claim 8, wherein at least one inter-cell frequency band is excluded from the CA capability information.

10. The UE of claim 8, wherein in response to transmitting the CA capability information, the at least one processor is further configured to:
    receive, from the at least one network entity, an indication identifying at least one secondary cell configuration associated with the one or more intra-cell frequency bands; and
    maintain a single component set configuration for communication according to the at least one secondary cell configuration on the one or more intra-cell frequency bands.

11. The UE of claim 10, wherein the single component set configuration permits both the first subscription and the second subscription to use similar UE communication components for CA.

12. The UE of claim 8, wherein the at least one processor is further configured to transmit different CA capability information including one or more inter-cell frequency bands for the first subscription based on determining that the first subscription associated with the first SIM corresponds to the DDS.

13. The UE of claim 8, wherein the first subscription supports a first technology type communication service and the second subscription supports a second technology type communication service.

14. The UE of claim 13, wherein the first technology type communication service includes at least one of application data or voice over Long Term Evolution (VoLTE) communication, and the second technology type communication service includes VoLTE.

15. A non-transitory computer-readable medium storing computer executable code for communication, comprising code for:
    determining that a first subscription associated with a first subscriber identity module (SIM) corresponds to a designated data subscription (DDS), with the first subscription being different from a second subscription associated with a second SIM at the UE;
    identifying at least one inter-cell frequency band within the carrier aggregation (CA) capability information;
    removing the at least one identified inter-cell frequency band from the CA capability information prior to transmission of the CA capability information; and
    transmitting, to at least one network entity, CA capability information including the at least one intra-cell frequency band for the second subscription based in part on determining that the first subscription associated with the first SIM corresponds to the DDS.

16. The non-transitory computer-readable medium of claim 15, wherein at least one inter-cell frequency band is excluded from the CA capability information.

17. The non-transitory computer-readable medium of claim 15, further comprising code for:
    in response to transmitting the CA capability information:
        receiving, from the at least one network entity, an indication identifying at least one secondary cell configuration associated with the one or more intra-cell frequency bands; and
        maintaining a single component set configuration for communication according to the at least one secondary cell configuration on the one or more intra-cell frequency bands.

18. The non-transitory computer-readable medium of claim 17, wherein the single component set configuration permits both the first subscription and the second subscription to use similar UE communication components for CA.

19. The non-transitory computer-readable medium of claim 15, further comprising code for transmitting different CA capability information including one or more inter-cell frequency bands for the first subscription based on determining that the first subscription associated with the first SIM corresponds to the DDS.

20. The non-transitory computer-readable medium of claim 15, wherein the first subscription supports a first technology type communication service and the second subscription supports a second technology type communication service.

21. An apparatus for wireless communications, comprising:
    means for determining that a first subscription associated with a first subscriber identity module (SIM) corresponds to a designated data subscription (DDS), with the first subscription being different from a second subscription associated with a second SIM at the UE;
    means for identifying at least one inter-cell frequency band within the carrier aggregation (CA) capability information;
    means for removing the at least one identified inter-cell frequency band from the CA capability information prior to transmission of the CA capability information; and
    means for transmitting, to at least one network entity, CA capability information including the at least one intra-cell frequency band for the second subscription based in part on determining that the first subscription associated with the first SIM corresponds to the DDS.

22. The apparatus of claim 21, wherein at least one inter-cell frequency band is excluded from the CA capability information.

23. The apparatus of claim 21, further comprising means for:
    in response to transmitting the CA capability information:
        receiving, from the at least one network entity, an indication identifying at least one secondary cell configuration associated with the one or more intra-cell frequency bands; and
        maintaining a single component set configuration for communication according to the at least one secondary cell configuration on the one or more intra-cell frequency bands.

24. The apparatus of claim 23, wherein the single component set configuration permits both the first subscription and the second subscription to use similar UE communication components for CA.

25. The apparatus of claim 21, further comprising means for transmitting different CA capability information including one or more inter-cell frequency bands for the first subscription based on determining that the first subscription associated with the first SIM corresponds to the DDS.

26. The apparatus of claim 21, wherein the first subscription supports a first technology type communication service and the second subscription supports a second technology type communication service.

* * * * *